(12) United States Patent
Kawalit

(10) Patent No.: US 8,607,945 B2
(45) Date of Patent: Dec. 17, 2013

(54) CARBON FIBER-REINFORCED INTELLIGENT WHEELED BACKPACK AND HUMAN TRANSPORTATION SEAT WITH ADJUSTABLE FOOT REST

(76) Inventor: Issa Afif Issa Kawalit, Amman (JO)

(*) Notice: Subject to any disclaimer, the term of this patent is extended or adjusted under 35 U.S.C. 154(b) by 436 days.

(21) Appl. No.: 13/079,825

(22) Filed: Apr. 5, 2011

(65) Prior Publication Data

US 2012/0255823 A1    Oct. 11, 2012

(51) Int. Cl.
*A47C 13/00* (2006.01)

(52) U.S. Cl.
USPC ............. 190/8; 297/423.1; 224/155; 190/115

(58) Field of Classification Search
USPC .................... 190/8, 18 A, 115; 224/576, 155; 297/423.19, 423.22, 423.23, 423.1
See application file for complete search history.

(56) References Cited

U.S. PATENT DOCUMENTS

| | | | | |
|---|---|---|---|---|
| 3,557,916 A * | 1/1971 | Stowell | ........................... | 190/11 |
| 5,100,198 A * | 3/1992 | Baltzell | ...................... | 312/235.2 |
| 5,273,307 A * | 12/1993 | Jarke et al. | ..................... | 280/643 |
| 5,374,073 A * | 12/1994 | Hung-Hsin | ...................... | 280/30 |
| 6,932,427 B2 * | 8/2005 | Tamura | ...................... | 297/217.1 |
| 7,097,017 B1 * | 8/2006 | LaCrosse et al. | .................. | 190/8 |
| 8,146,722 B1 * | 4/2012 | Moreno et al. | .............. | 190/18 A |
| 2004/0021353 A1 * | 2/2004 | Lozano et al. | ................. | 297/255 |
| 2008/0042379 A1 * | 2/2008 | Amran | ............................. | 280/30 |

* cited by examiner

*Primary Examiner* — Tri Mai
(74) *Attorney, Agent, or Firm* — Raj Abhyanker, P.C.

(57) ABSTRACT

A system and a method of a carbon fiber-reinforced intelligent wheeled backpack and human transportation seat with adjustable foot rest is disclosed. In one embodiment, a method of simultaneous human being and luggage transportation through an airport may include coupling an upper part of a handle assembly to a hollow lower part through a connector wherein the upper part of the handle assembly may be permitted to be pulled in and out of the hollow lower part of the handle assembly. A backpack body comprising a carbon fiber-reinforced polymer (CFRP) material may be coupled to the hollow lower part of the handle assembly wherein the backpack body may include spinable wheels, an adjustable seat, and adjustable footrests for simultaneous human and luggage transportation.

19 Claims, 17 Drawing Sheets

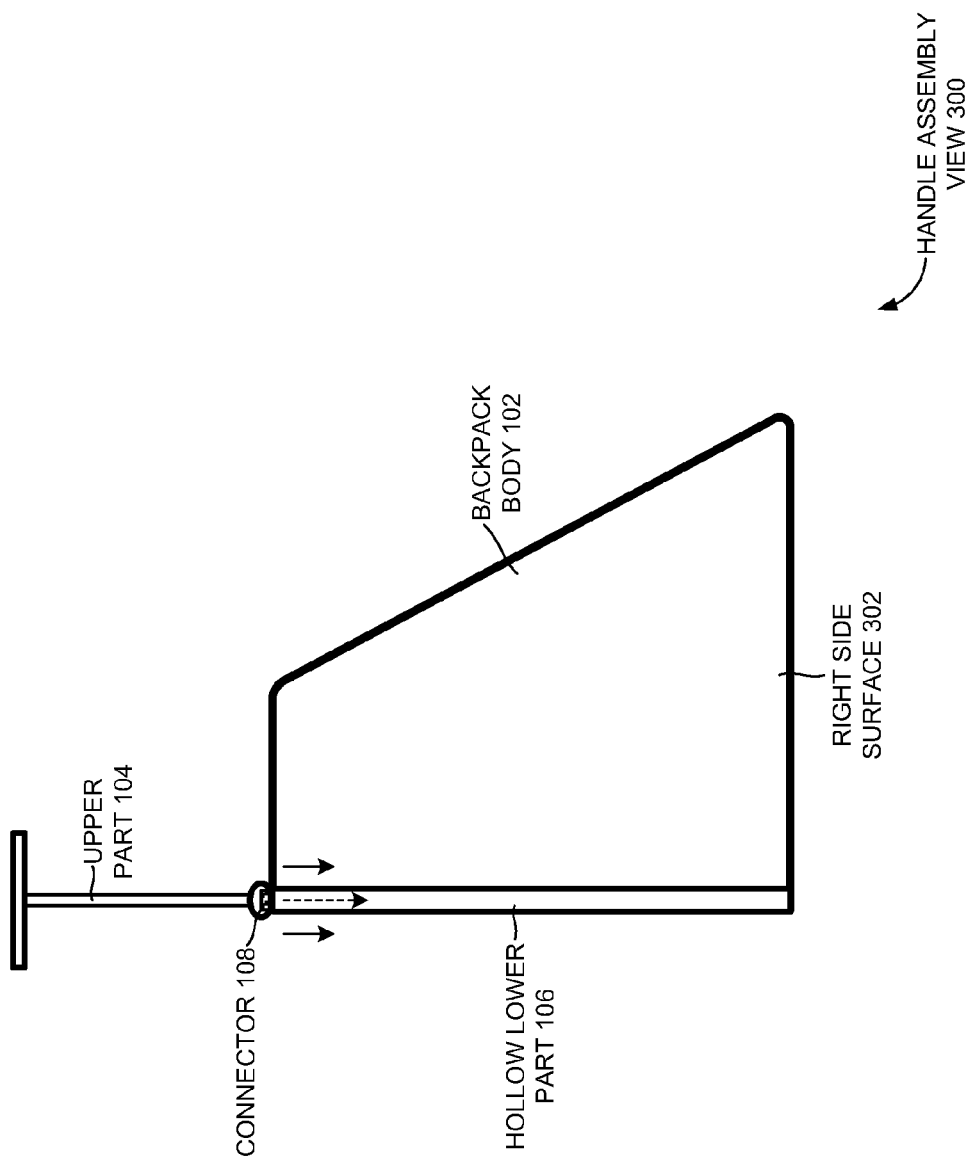

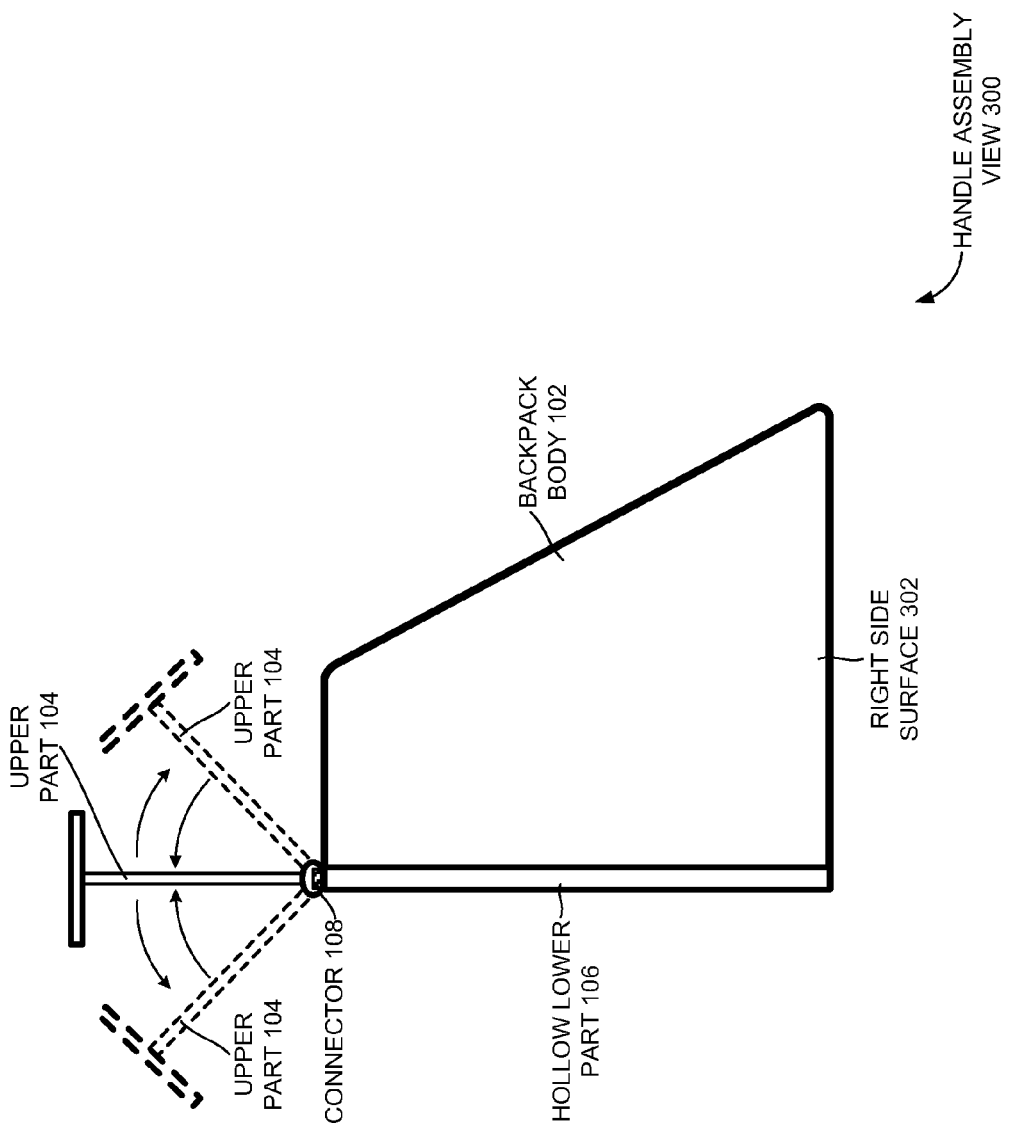

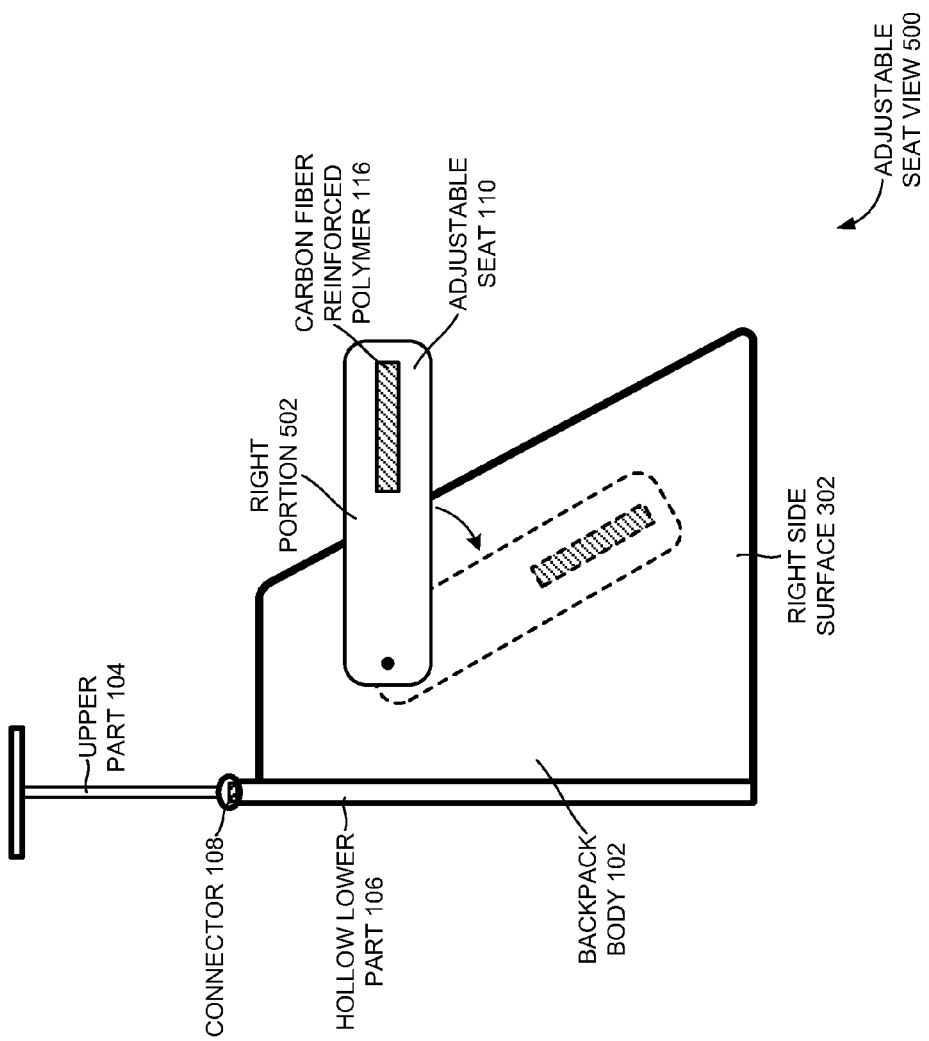

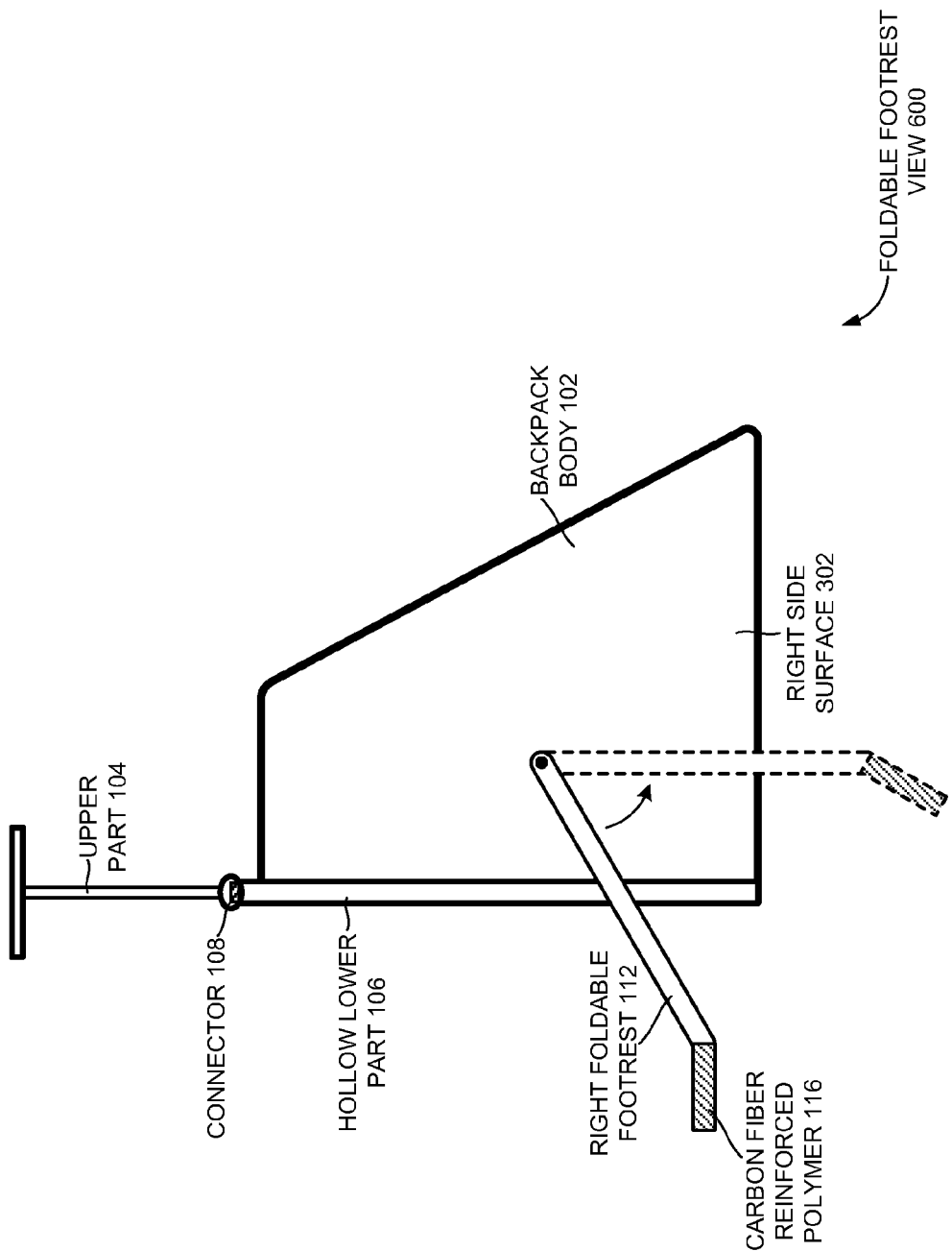

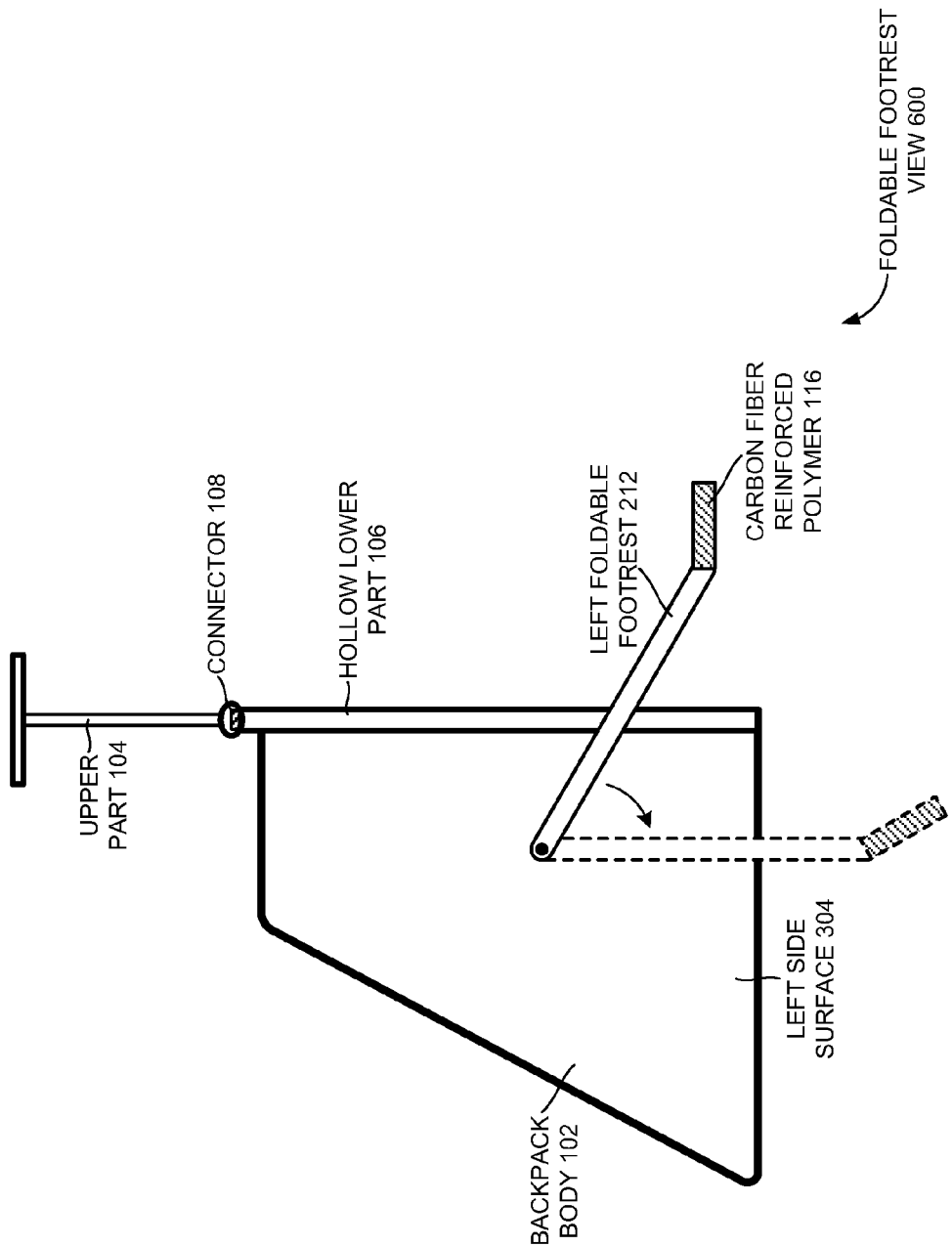

CARBON FIBER-REINFORCED INTELLIGENT WHEELED BACKPACK AND HUMAN TRANSPORTATION SEAT WITH ADJUSTABLE FOOT REST

FIELD OF TECHNOLOGY

This disclosure relates generally to a human transportation backpack, in one example embodiment, to a carbon fiber-reinforced intelligent wheeled backpack and human transportation seat with adjustable foot rest.

BACKGROUND

There exist today many styles of luggage for use in an airport and on to store on-board an aircraft (e.g., a roll-able carry-on luggage, a backpack, a carry-on bag, etc.). There also exist many methods and devices for carrying a human being through an airport or other area requiring forward motion (e.g., stretcher, a wheelchair, a pram, etc.). By way of example, both the functions of luggage movement and human movement may be mutually exclusive. Luggage movement may require its own set of devices and human movement may have its own set of devices. In addition, a luggage may want to be able to be carried on a human back for ease of transport and to provide additional comfort to the user.

Transporting luggage and humans through an airport simultaneously has a unique benefit. There may be times when a child or an adult and items in the form of luggage may have to be carried simultaneously through the airport. Furthermore, it may be imperative for the personal items in the form of luggage to be able to be carried in a backpack on a human back. It is not uncommon for injured persons, handicapped persons or even children to be carried through an airport or during any travel related situation, be it indoors or outdoors. Existing devices and methods are not strong enough to accommodate an adult human being in times of emergency or during periods of personal disablement. In addition, existing devices are not comfortable enough to provide the agility, comfort, flexibility and ease of transport in tough situations. Lastly, as an example, existing devices may not be carried on a human back in the form of a backpack.

Existing mechanisms may make some effort to address a problem of moving people and luggage simultaneously. U.S. App. No. US2008/0164667, U.S. Pat. No. 6,932,427, U.S. Pat. No. 3,679,223, and U.S. Pat. No. 5,899,467 may generally disclose some type of a carry-on luggage, a baby carriage, a suitcase chair and a suitcase stroller. None of these disclosures however, may offer any mechanism, method or device to solve the problem of human weight, safety, and comfort. In today's high-paced travel world, economy, ease of use, convenience, and most importantly, safety and comfort may be of paramount importance. A backpack mechanism that is strong and agile enough to carry luggage as well as transport a human being in time of need may be invaluable item of for any traveler—especially a traveler who may be traveling with pregnant women, children, disabled people, handicapped people etc.

According to one exemplary embodiment, the invention is a carbon fiber-reinforced intelligent wheeled backpack and human transportation seat with adjustable foot rest. In at least on example of the embodiment, the backpack may have a fully adjustable and storable seating mechanism built into it with a carbon-fiber material that would enable a traveler to use the backpack to carry luggage as well as transport a human being in any travel situation by supporting a human being up to 200 lbs. in weight, not just a child. According to another embodiment, portions of the backpack may also be constructed from a carbon-fiber material. The invention, according to at least one embodiment, may include a fully adjustable and retractable seat and fully retractable and foldable foot-rests for each foot to facilitate the ease, convenience, safety, and comfort of travel. The carbon-fiber material may be implemented, in one exemplary embodiment, through a carbon-fiber reinforced polymer or a carbon-fiber reinforced plastic.

Other benefits, uses and advantages of the invention will be apparent from the summary, brief description of the drawings, the detailed disclosure and the description that follows.

SUMMARY

A carbon fiber-reinforced intelligent wheeled backpack and human transportation seat with adjustable foot rest is disclosed. According to one exemplary embodiment, the invention may include an upper part, a connector, a hollow lower part, a left spinable wheel, a right spinable wheel, an adjustable seat, a left foldable foot rest, a right foldable foot rest and a carbon fiber-reinforced polymer. In another exemplary embodiment, the backpack body may have a top surface, a bottom surface, a front surface, a back surface, a left side surface, a right side surface, and a shoulder harness.

In one aspect, an apparatus having a handle assembly comprising an upper part and a hollow lower part wherein the upper part is coupled to the hollow lower part through a connector is disclosed. In this embodiment, the upper part may be able to be pulled in and out of the lower part. Another embodiment may include a backpack body that may be opened on at least one side having left and right side surfaces and may comprise a carbon fiber-reinforced polymer (CFRP) material or a carbon fiber-reinforced plastic (CRP) material. The embodiment may also comprise a top surface, a bottom surface, and front and back surfaces, wherein the back surface of the backpack may be coupled to the hollow lower part of the handle assembly. In an exemplary embodiment, at least one spinable wheel may be affixed to each corner of the bottom surface of the backpack body. Spinable wheels may also be affixed to all four corners of the bottom surface of the backpack body.

In yet another embodiment, an adjustable seat comprising a left portion, a right portion and a center portion may be affixed to the left and right side surfaces of the backpack body. The adjustable seat may comprise a carbon fiber-reinforced polymer (CFRP) material or a carbon fiber-reinforced plastic (CRP) material. In another exemplary aspect, an adjustable left foldable foot rest may be affixed to the left side surface of the backpack body such that the left foldable foot rest may move horizontally forward and backward and an adjustable right foldable foot rest may be affixed to the right side surface of the backpack body such that the right foldable footrest may move horizontally forward and backward. The left foldable foot rest and the right foldable foot rest may comprise a carbon fiber-reinforced polymer (CFRP) material or a carbon fiber-reinforced plastic (CRP) material.

In another distinct exemplary embodiment, a system of simultaneous human being and luggage transportation through an airport may be disclosed. The system may involve a handle assembly for maneuvering the system comprising an upper part and a hollow lower part wherein the upper part may be coupled to the hollow lower part through a connector and may be pulled in and out of the hollow lower part. The embodiment may also include a backpack body that may be openable on least one side and the backpack body may have left and right side surfaces and may comprise a carbon fiber-reinforced polymer (CFRP) material or a carbon fiber-reinforced plastic (CRP) material. The backpack body, according to one embodiment, may also include a top surface, a bottom surface, and front and back surfaces, wherein the back surface of the backpack may be coupled to the hollow lower part of the handle assembly.

In another embodiment, at least one spinable wheel may be affixed to each corner of the bottom surface of the backpack body for maneuvering the apparatus. An adjustable seat comprising a left portion, a right portion and a center portion may also be affixed to the left and right side surfaces of the backpack body and an adjustable left foldable foot rest may be affixed to the left side surface of the backpack body such that the left foldable foot rest may move horizontally forward and backward. Similarly, an adjustable right foldable foot rest may also be affixed to the right side surface of the backpack body such that the right foldable footrest may also move horizontally forward and backward, according to one embodiment.

An exemplary embodiment may include a method of simultaneous human being and luggage transportation through an airport by coupling an upper part of a handle assembly to a hollow lower part through a connector wherein the upper part of the handle assembly may be permitted to be pulled in and out of the hollow lower part of the handle assembly. According to this embodiment, a backpack body that is openable on least one side, the backpack body having left and right side surfaces comprising at least one of a carbon fiber-reinforced polymer (CFRP) material and a carbon fiber-reinforced plastic (CRP) material, a top surface, a bottom surface, and front and back surfaces, wherein the back surface of the backpack may be coupled to the hollow lower part of the handle assembly may be installed.

Another embodiment may involve affixing at least one spinable wheel to each corner of the bottom surface of the backpack body for maneuvering the apparatus, affixing an adjustable seat comprising a left portion, a right portion and a center portion to the left and right side surfaces of the backpack body, connecting an adjustable left foldable foot rest to the left side surface of the backpack body such that the left foldable foot rest may move horizontally forward and backward, connecting an adjustable right foldable foot rest to the right side surface of the backpack body such that the right foldable footrest may move horizontally forward and backward and maneuvering the backpack body and the human with the upper part of the handle assembly.

In one exemplary embodiment, the left side surface of the backpack body, the right side surface of the backpack body, the left foldable foot rest, the right foldable foot rest, the left portion of the adjustable seat, the right portion of the adjustable seat, and the center portion of the adjustable seat may comprise at least one of a carbon fiber-reinforced polymer (CFRP) material and a carbon fiber-reinforced plastic (CRP) material.

The methods, systems, and apparatuses disclosed herein may be implemented in any means for achieving various aspects. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIGS. 3A and 3B show a handle assembly view (left and right side views of the backpack body) which illustrates the backpack body affixed to the handle assembly which comprises an upper part, a hollow lower part and a connector, according to one embodiment.

FIG. 3C is also illustrates another aspect of a handle assembly view which illustrates the flexibility and functioning of the upper part of the backpack body, according to one embodiment.

FIGS. 5A, 5B and 5C show an adjustable seat view according to one embodiment and illustrate the right portion, the left portion, and center portion of the adjustable seat.

FIGS. 6A and 6B show a foldable foot rest view and illustrate a right foldable foot rest and a left foldable footrest according to one embodiment.

Figure 1:
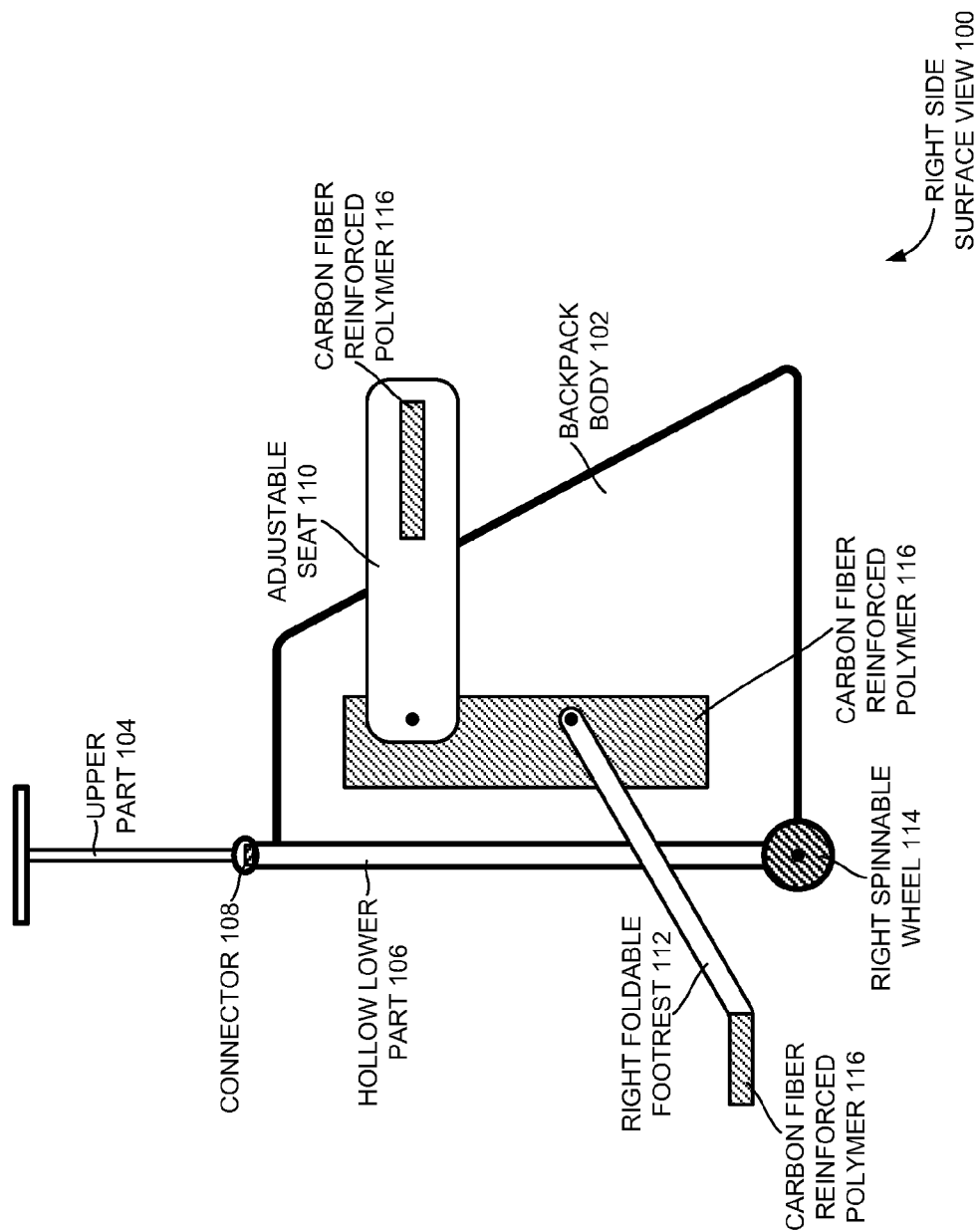
FIG. 1 is a right surface view of the backpack body according to one embodiment and illustrates the adjustable seat and the handle assembly in relation to the backpack body in addition to the areas comprising the carbon fiber-reinforced material.

Other features of the present embodiments will be apparent from the accompanying drawings and from the detailed description that follows.

DETAILED DESCRIPTION

A carbon fiber-reinforced intelligent wheeled backpack and human transportation seat with adjustable foot rest is disclosed. In the following description of preferred embodiments, reference is made to the accompanying drawings which form a part hereof, and in which it is shown by way of illustration specific embodiments in which the invention can be practiced. It is to be understood that other embodiments can be utilized and structural changes can be made without departing from the scope of the preferred embodiments of the present invention.

According to one exemplary embodiment, the invention may include an upper part 104, a connector 108, a hollow lower part 106, a left spinable wheel 214, a right spinable wheel 114, an adjustable seat 110, a left foldable foot rest 212, a right foldable foot rest 112 and a carbon fiber-reinforced polymer 116. In another exemplary embodiment, the backpack body 102 may have a top surface 806, a bottom surface 804, a front surface 402, a back surface 802, a left side surface, 304 a right side surface 302, and a shoulder harness 808.

Figure 3B:
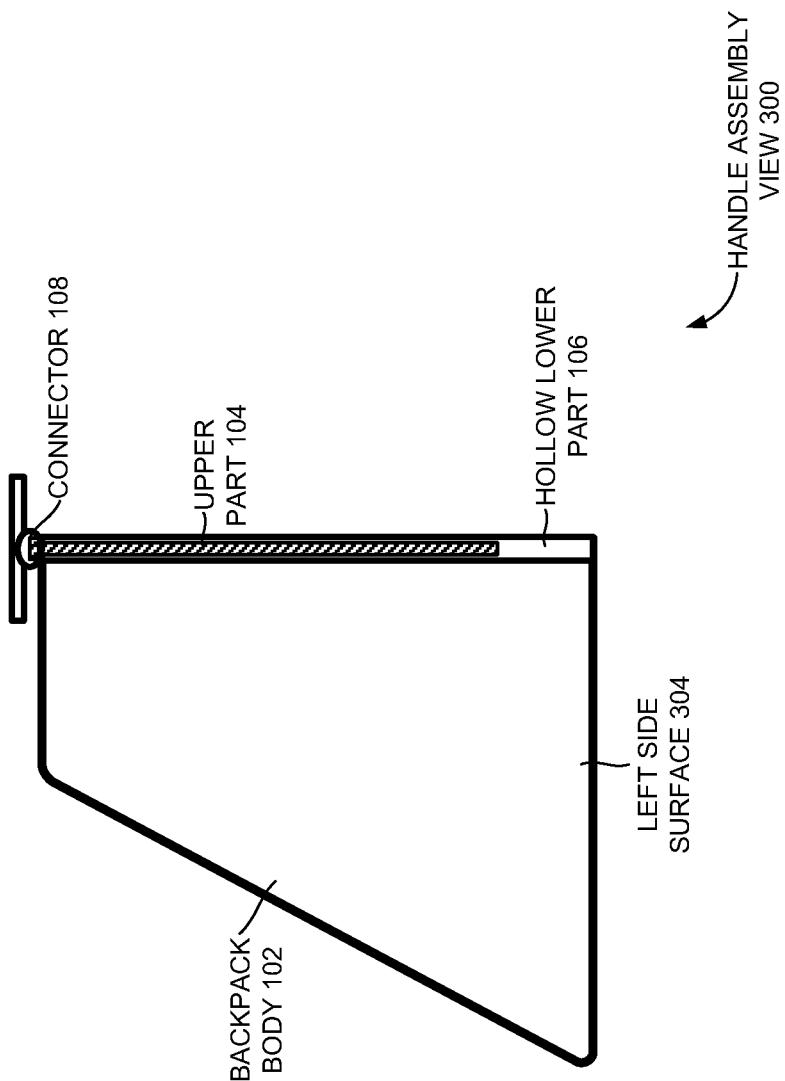
Figure 4:
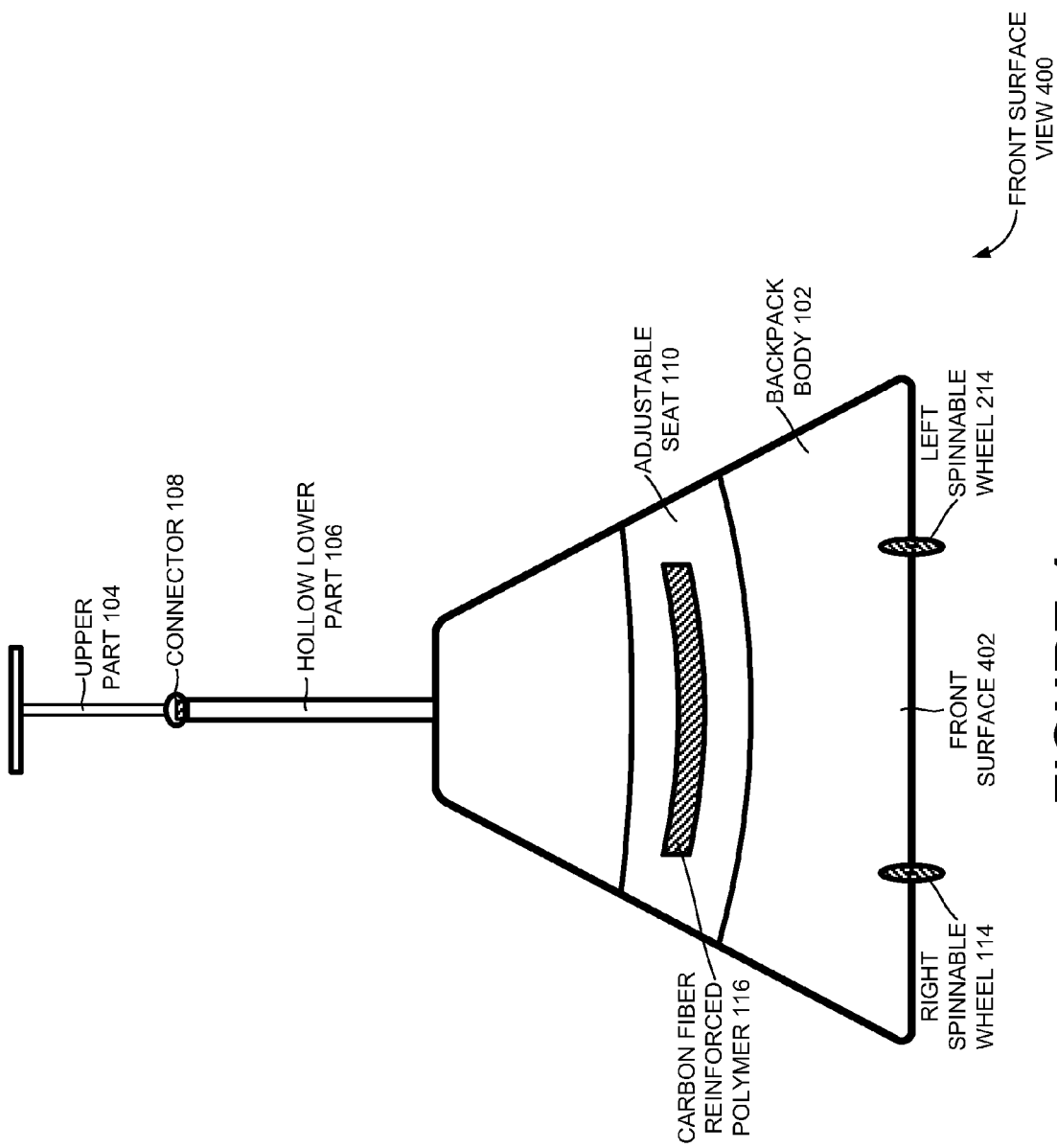
FIG. 4 is a front surface view of the backpack body and handle assembly with the adjustable seat mechanism according to one embodiment.
Figure 8:
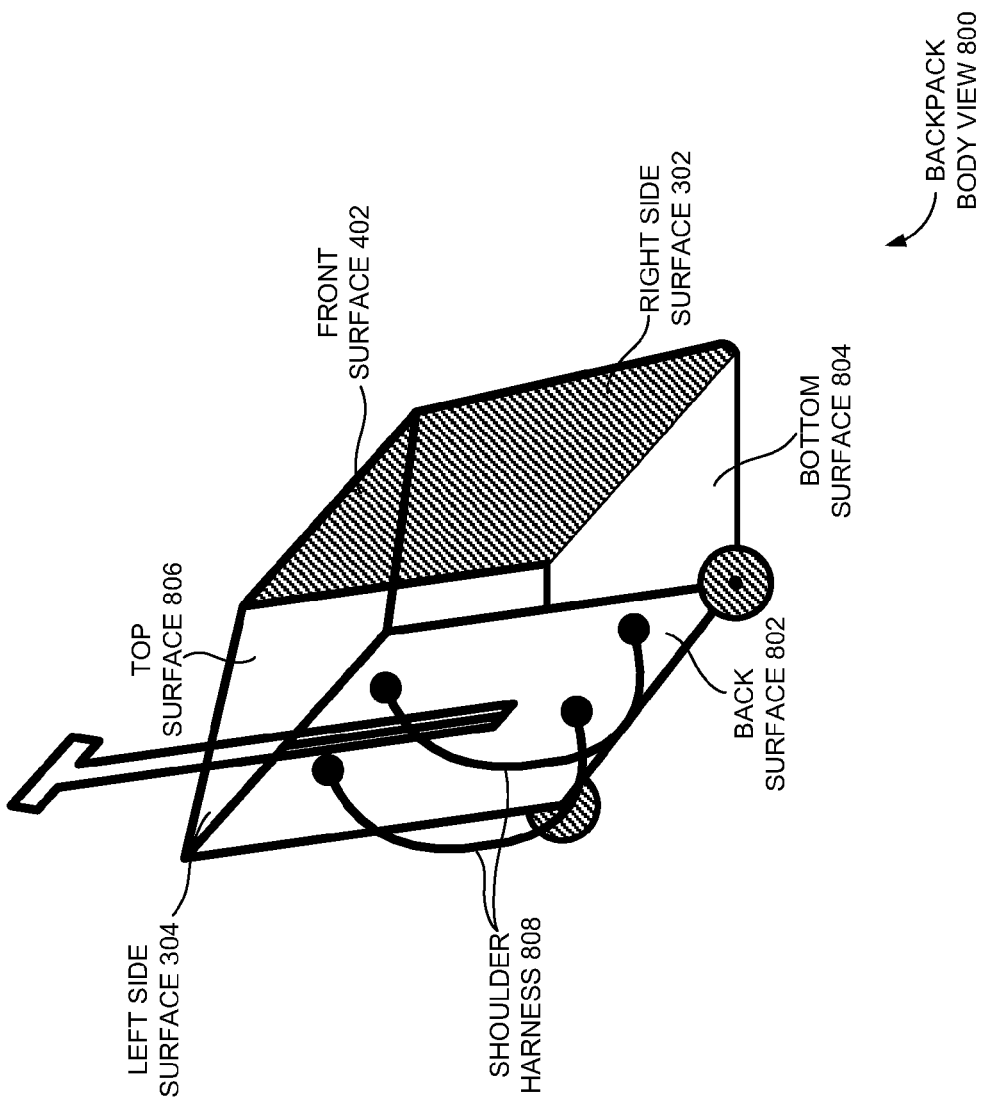
FIG. 8 illustrates a backpack body view according to one embodiment.

In one aspect, an apparatus having a handle assembly comprising an upper part 104 and a hollow lower part 106 wherein the upper part 104 may coupled to the hollow lower part 106 through a connector 108. In this embodiment, the upper part 104 may be able to be pulled in and out of the lower part. Another embodiment may include a backpack body 102 that may be opened on at least one side having left and right side surfaces (e.g., left side surface 304 and right side surface 302 as shown in FIGS. 3A and 3B) and may comprise a carbon fiber-reinforced polymer 116 (CFRP) material or a carbon fiber-reinforced plastic (CRP) material. The embodiment may also comprise a top surface 806, a bottom surface 804, and front and back surfaces (e.g., front surface 402 and back surface 802 as shown in FIGS. 4 and 8) wherein the back surface 802 of the backpack body 102 may be coupled to the hollow lower part 106 of the handle assembly. In an exemplary embodiment, at least one spinable wheel (e.g., a right spinable wheel 114 and a left spinable wheel 214 of FIGS. 1 and 2) may be affixed to each corner of the bottom surface 804 of the backpack body 102. Spinable wheels may also be affixed to all four corners of the bottom surface 804 of the backpack body 102.

In yet another embodiment, an adjustable seat 102 comprising a left portion 504, a right portion 502 and a center portion 506 may be affixed to the left and right side surfaces of the backpack body (e.g., left side surface 304 and right side surface 302 as shown in FIGS. 3A and 3B). The adjustable seat 102 may comprise a carbon fiber-reinforced polymer 116 (CFRP) material or a carbon fiber-reinforced plastic (CRP) material. In another exemplary aspect, an adjustable left foldable foot rest 212 may be affixed to the left side surface 304 of the backpack body 102 such that the left foldable foot rest 212 may move horizontally forward and backward and an adjustable right foldable foot rest 112 may be affixed to the right side surface 302 of the backpack body 102 such that the right foldable footrest 112 may move horizontally forward and backward. The left foldable foot rest 212 and the right foldable foot 112 rest may comprise a carbon fiber-reinforced polymer 116 (CFRP) material or a carbon fiber-reinforced plastic (CRP) material.

In another distinct exemplary embodiment, a system of simultaneous human being and luggage transportation through an airport may be disclosed. The system may involve a handle assembly for maneuvering the system comprising an upper part 104 and a hollow lower part 106 wherein the upper part 104 may be coupled to the hollow lower part 106 through a connector 108 and may be pulled in and out of the hollow lower part 106. The embodiment may also include a backpack body 102 that may be openable on least one side and the backpack body may have left and right side surfaces (e.g., left side surface 304 and right side surface 302 as shown in FIGS. 3A and 3B) and may comprise a carbon fiber-reinforced polymer 116 (CFRP) material or a carbon fiber-reinforced plastic (CRP) material. The backpack body 102, according to one embodiment, may also include a top surface 806, a bottom surface 804, and front and back surfaces (e.g., front surface 402 and back surface 802 as shown in FIGS. 4 and 8), wherein the back surface 802 of the backpack body 102 may be coupled to the hollow lower part 106 of the handle assembly.

Figure 2:
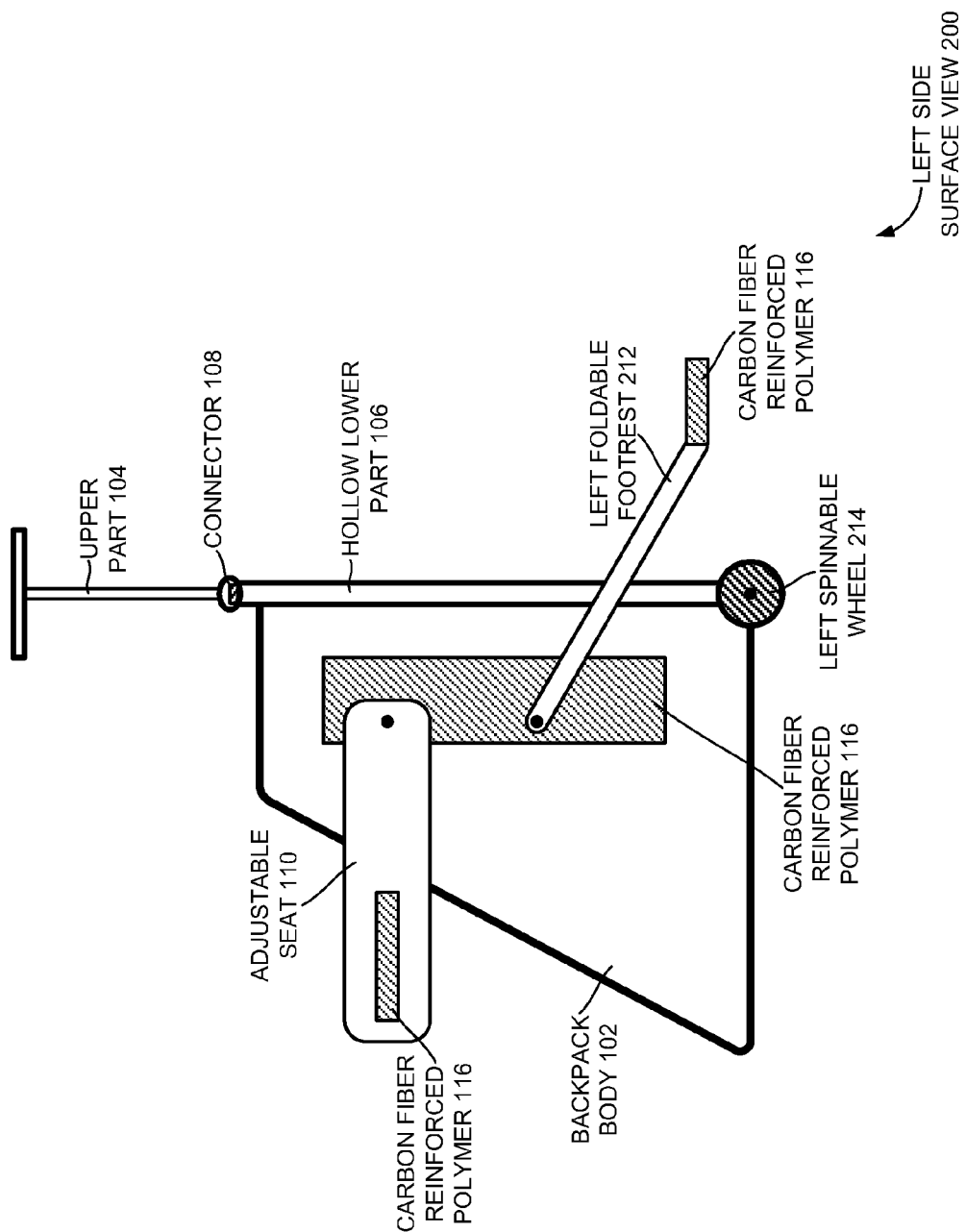
FIG. 2 is a left surface view of the backpack body according to one embodiment and illustrates the adjustable seat and the handle assembly in relation to the backpack body in addition to the areas comprising the carbon fiber-reinforced material.

In another embodiment, at least one spinable wheel may be affixed to each corner of the bottom surface of the backpack body for maneuvering the apparatus (e.g., a right spinable wheel 114 and a left spinable wheel 214 of FIGS. 1 and 2). An adjustable seat 110 comprising a left portion 504, a right portion 502 and a center portion 506 may also be affixed to the left and right side surfaces of the backpack body 102 and an adjustable left foldable foot rest 212 may be affixed to the left side surface (e.g., left side surface 304 FIG. 3B) of the backpack body 102 such that the left foldable foot rest 212 may move horizontally forward and backward. Similarly, an adjustable right foldable foot rest 112 may also be affixed to the right side surface (e.g., right side surface 302 FIG. 3A) of the backpack body 102 such that the right foldable footrest 112 may also move horizontally forward and backward, according to one embodiment.

An exemplary embodiment may include a method of simultaneous human being and luggage transportation through an airport by coupling an upper part 104 of a handle assembly to a hollow lower part 106 through a connector 108 wherein the upper part 104 of the handle assembly may be permitted to be pulled in and out of the hollow lower part 106 of the handle assembly. According to this embodiment, a backpack body 102 that is openable on least one side, the backpack body 102 having left and right side surfaces (e.g., left side surface 304 and right side surface 302 as shown in FIGS. 3A and 3B) comprising at least one of a carbon fiber-reinforced polymer 116 (CFRP) material and a carbon fiber-reinforced plastic (CRP) material, a top surface 806, a bottom surface 804, and front and back surfaces (e.g., front surface 402 and back surface 802 as shown in FIGS. 4 and 8), wherein the back surface 802 of the backpack body 102 may be coupled to the hollow lower part 106 of the handle assembly may be installed.

Another embodiment may involve affixing at least one spinable wheel (e.g., a right spinable wheel 114 and a left spinable wheel 214 of FIGS. 1 and 2) to each corner of the bottom surface 804 of the backpack body 102 for maneuvering the apparatus, affixing an adjustable seat 110 comprising a left portion 504, a right portion 502 and a center portion 506 to the left and right side surfaces (e.g., left side surface 304 and right side surface 302 as shown in FIGS. 3A and 3B) of the backpack body 102, connecting an adjustable left foldable foot rest 212 to the left side surface 304 of the backpack body 102 such that the left foldable foot rest 212 may move horizontally forward and backward, connecting an adjustable right foldable foot rest 112 to the right side surface 302 of the backpack body 102 such that the right foldable footrest 112 may move horizontally forward and backward and maneuvering the backpack body 102 and the human 702 with the upper part 104 of the handle assembly.

In one exemplary embodiment, the left side surface 304 of the backpack body 102, the right side surface 302 of the backpack body 102, the left foldable foot rest 212, the right foldable foot rest 112, the left portion 504 of the adjustable seat 110, the right portion 502 of the adjustable seat 110, and the center portion 506 of the adjustable seat 110 may comprise at least one of a carbon fiber-reinforced polymer 116 (CFRP) material and a carbon fiber-reinforced plastic (CRP) material.

FIG. 1 illustrates a right side view 100 according to one embodiment. An upper part 104 may be connected to a hollow lower part 106 through a connector 108. Typically, at least according to one embodiment, the upper part 104 may be thinner than the hollow lower part 106 and can fit into the hollow lower part 106 and may even be able to be pulled in and out of the hollow lower part 106. The upper part 104 and the hollow lower part 106 may comprise a carbon fiber-reinforced polymer 116 material. The carbon fiber-reinforced polymer 116 material may also be placed on the right side surface 302 of the backpack body 102 to support the right foldable footrest 112 and the adjustable seat 110. A right spinable wheel 114 may be placed on a bottom surface 804 of the backpack body 102, according to one embodiment.

FIG. 2 illustrates a left side view 200 according to one embodiment. An upper part 104 may be connected to a hollow lower part 106 through a connector 108. Typically, at least according to one embodiment, the upper part 104 may be thinner than the hollow lower part 106 and can fit into the hollow lower part 106 and may even be able to be pulled in and out of the hollow lower part 106. The upper part 104 and the hollow lower part 106 may comprise a carbon fiber-reinforced polymer 116 material. The carbon fiber-reinforced polymer 116 material may also be placed on the left side surface 304 of the backpack body 102 to support the left foldable footrest 212 and the adjustable seat 110. A right spinable wheel 214 may be placed on a bottom surface 804 of the backpack body 102, according to one embodiment.

FIG. 3A and 3B illustrate a handle assembly view 300 according to one embodiment. FIG. 3A shows the right side surface 302 of the backpack body 102 wherein the upper part 104 may be thinner than the hollow lower part 106 and can fit into the hollow lower part 106 and may even be able to be pulled in and out of the hollow lower part 106. FIG. 3B shows a left side surface 304 of the backpack body 102 wherein the upper part 104 may be thinner than the hollow lower part 106 and can fit into the hollow lower part 106 and may even be able to be pulled in and out of the hollow lower part 106. A connector 108 may enable the upper part 104 to be pulled in and out of the hollow lower part 106.

FIG. 3C illustrates another aspect of handle assembly 300 according to another embodiment. An upper part 104 may be able to be recessed or adjusted left and right depending on the comfort level of the user of the backpack body 102 through use of the connector 108. The upper part 104 may move forward and backward as well as may be recessed inside the hollow lower part 106. The movement of upper part 104 may allow for ease of use, comfort and mobility of the backpack body 102 according to one embodiment.

FIG. 4 illustrates a front surface view 400 of the claimed invention according to one exemplary embodiment. The upper part 104 may be connected to the hollow lower part 106 through a connector 108. The backpack body 102, in at least one embodiment, has a front surface 402 wherein a portion of the adjustable seat 110 (e.g., a center portion 506 according to FIG. 5C) is on the front surface 402 of the backpack body 102. A left spinable wheel 214 and a right spinable wheel 114 may be affixed to the bottom surface 804 (as shown in FIG. 8) of the backpack body 102. The center portion 506 of the adjustable seat 110 may be composed of a carbon fiber-reinforced polymer 116 to add to the backpack body 102's stability and in addition, to the backpack body 102's ability to support a weight of a human, according to an embodiment.

Figure 5B:
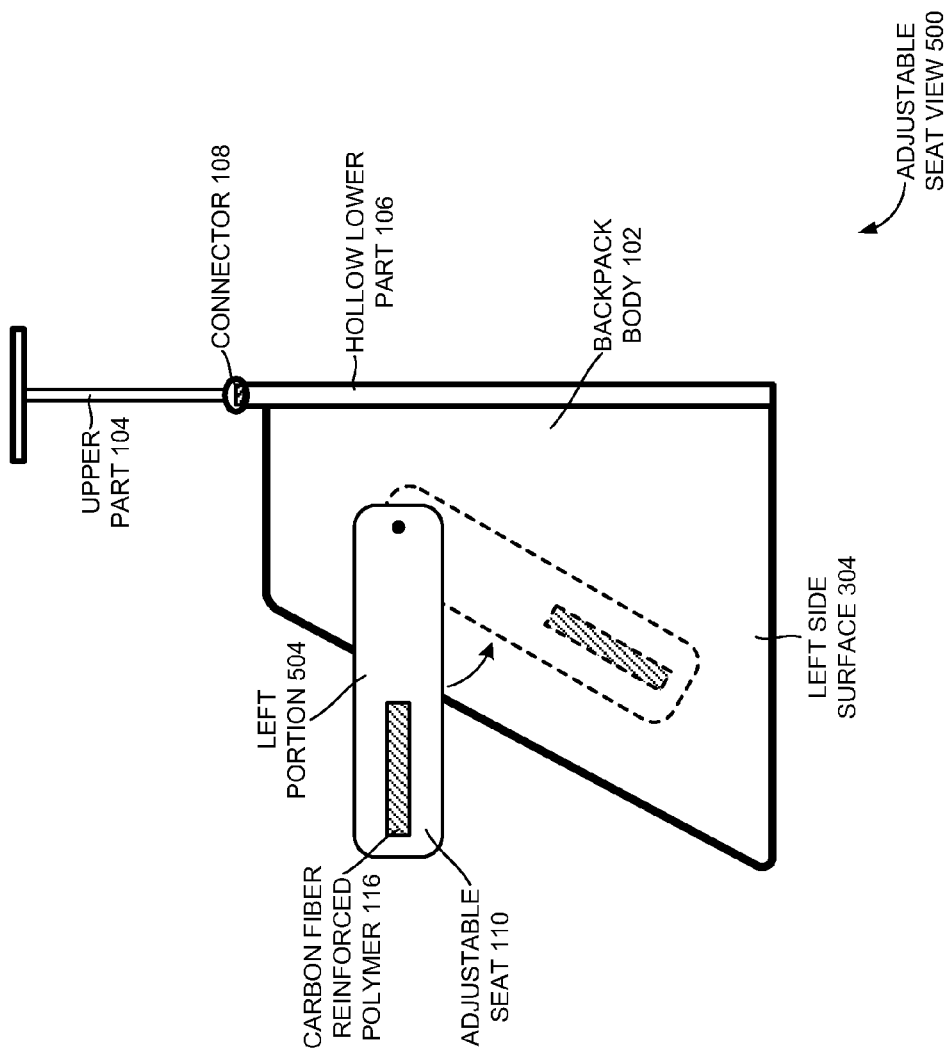
Figure 5C:
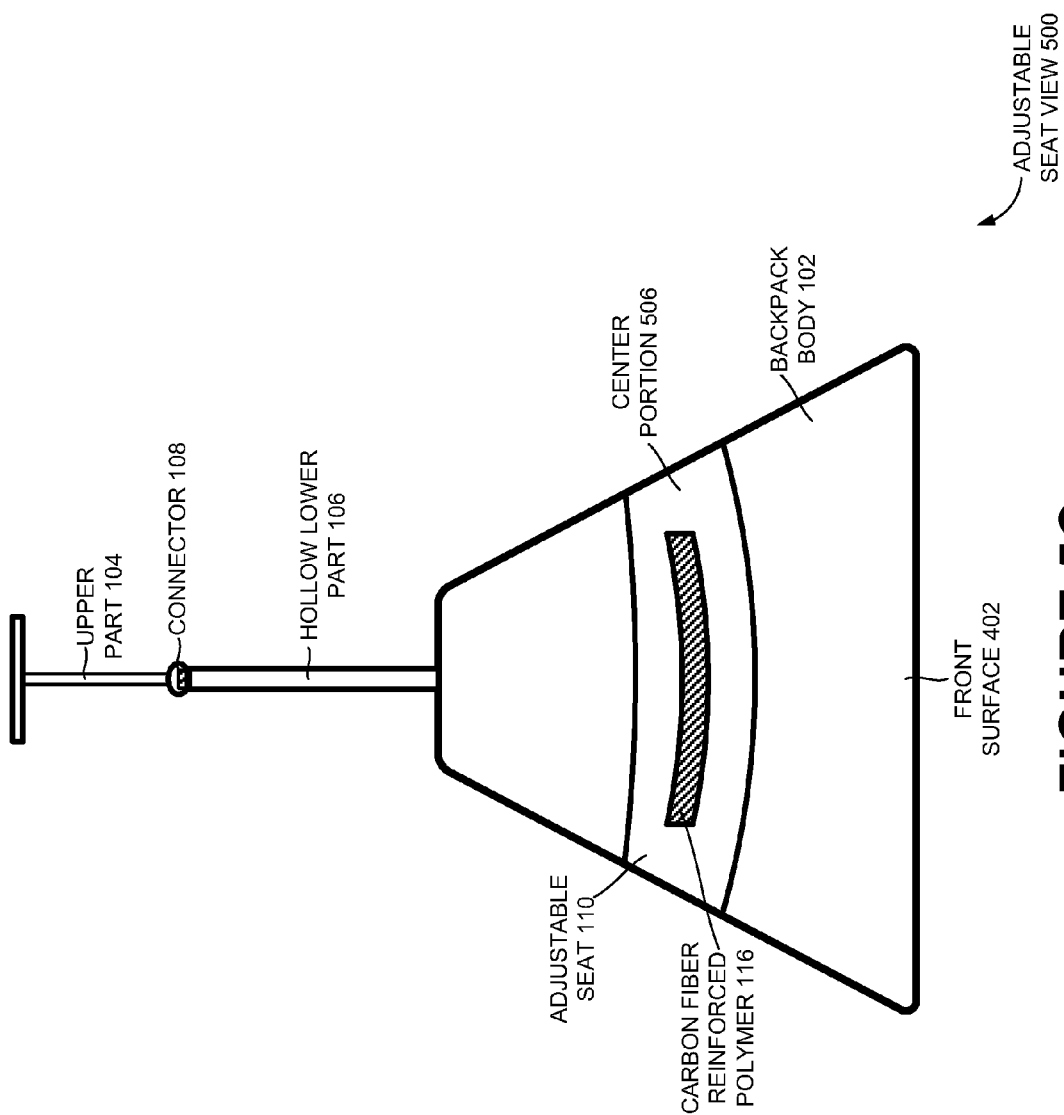

FIGS. 5A, 5B and 5C, illustrate an adjustable seat view 500 according to one embodiment. FIG. 5A shows a right side surface 302 of the backpack body 102 with the right portion 502 of the adjustable seat 110 affixed to the right side surface 302 of the backpack body 102, according to one embodiment. FIG. 5B shows a left side surface 304 of the backpack body 102 with the left portion 504 of the adjustable seat 110 affixed to the left side surface 304 of the backpack body 102, according to another embodiment. FIG. 5C shows a front surface 402 of the backpack body 102 with the center portion 506 of the adjustable seat 110 affixed to the front surface 402 of the backpack body 102, according to an embodiment. The right portion 502 and the left portion 504 may be attached to the center portion 506 to form the adjustable seat 110 according to one embodiment. The adjustable seat 110 may also be fully adjustable to move forward and backward as needed. In the backward position, the adjustable seat 110 may be recessed against the side of the backpack body 102 when it is not being used (e.g., the left portion 504 may be recessed against the left side surface 304, the right portion 504 may be recessed against the right side surface 302 and the center portion 506 may be recessed against the front surface 402) according to one embodiment.

FIG. 6A and 6B illustrate a foldable footrest view 600 according to one exemplary embodiment. FIG. 6A shows a right foldable footrest 112 affixed to the right side surface 302 of a backpack body 102. The right foldable footrest 112 may be fully adjustable and may move backwards and forwards as needed and may be recessed against the right side surface 302 when it is not in use. Similarly, FIG. 6B shows a left foldable footrest 212 affixed to the left side surface 304 of a backpack body 102. The left foldable footrest 212 may be fully adjustable and may move backwards and forwards as needed and may be recessed against the left side surface 304 when it is not in use. Both the left foldable footrest 212 and the right foldable footrest 112 may be composed of a carbon fiber-reinforced polymer 116.

Figure 7:
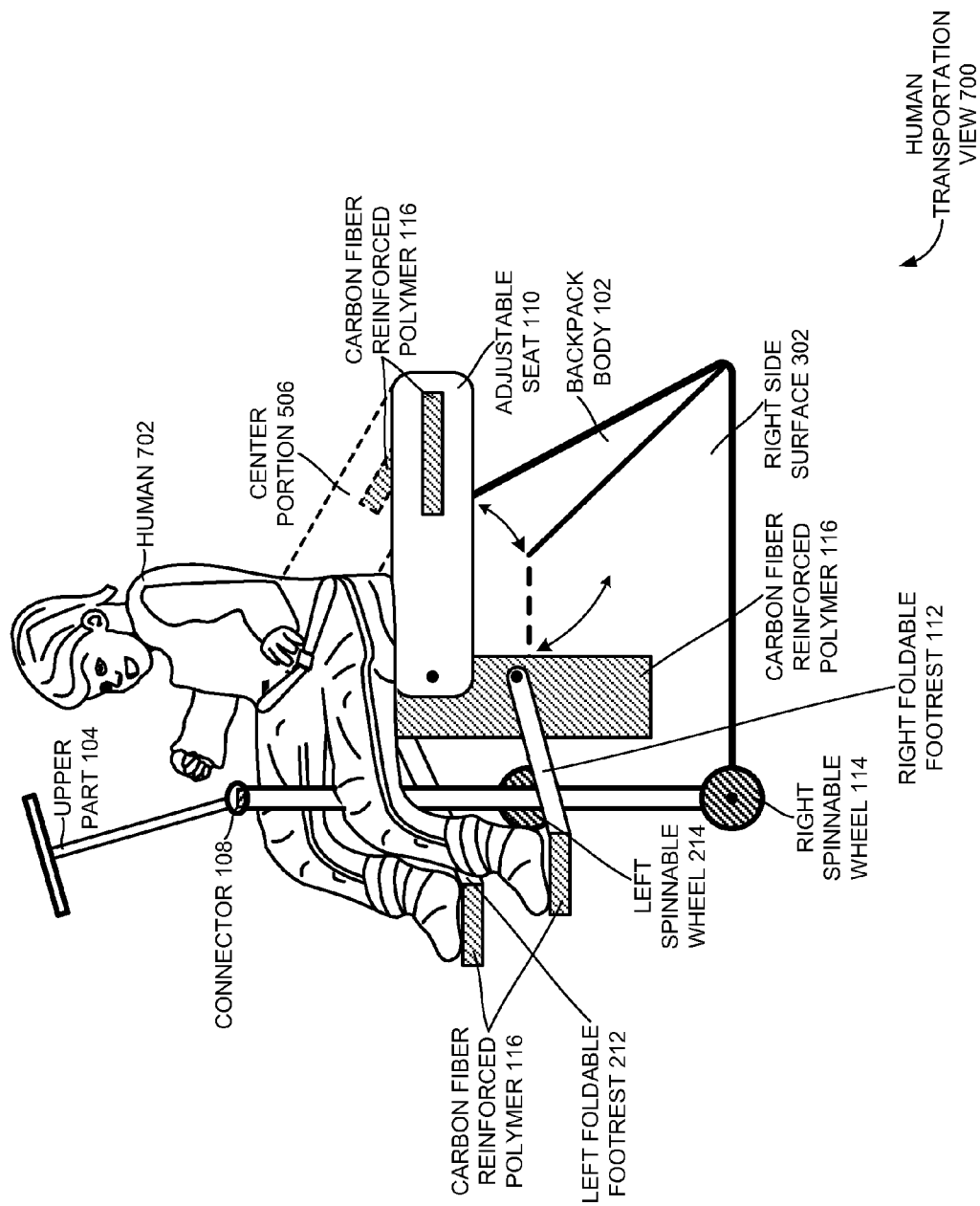
FIG. 7 illustrates a human transportation view according to one embodiment.

FIG. 7 is a human transportation view 700 according to one embodiment. The upper part 104 may be connected to the hollow lower part 106 with a connector 108 to form the handle assembly which may be affixed the back surface 802 of the backpack body 102. A human 702 may be placed on the adjustable seat 110 and the buttocks of the human 702 may rest on the center portion 506 of the adjustable seat 110. The human 702's left foot may be placed on the left foldable footrest 212 and the human 702's right foot may be placed on the right foldable footrest 112. A carbon fiber-reinforced polymer 116 may comprise all or parts of the left foldable footrest 212, the right foldable footrest 112, the left side surface 304, the right side surface 302, and the left portion 504, the right portion 502 and the center portion 506 of the adjustable seat 110. A right spinable wheel 114 may be affixed to the bottom surface 804 of the backpack body 102 and the backpack body 102 and the human 702 may be maneuvered with the upper part 104 of the handle assembly according to one exemplary embodiment. The human transportation view 700 illustrates the right side surface 302 of the invention, according to one embodiment.

FIG. 8 illustrates a backpack body view 800 according to one embodiment. The backpack body 102 may be openable on at least one side and may comprise a top surface 806, a bottom surface 804, a front surface 402, a back surface 802, a left side surface 304 and a right side surface 302. In addition, a shoulder harness 808 may be affixed to the back surface 802 of the backpack body 102 so that the backpack body 102 may be carried on a human back when it is not being operated for human transportation purposes, according to one embodiment.

Figure 9A:
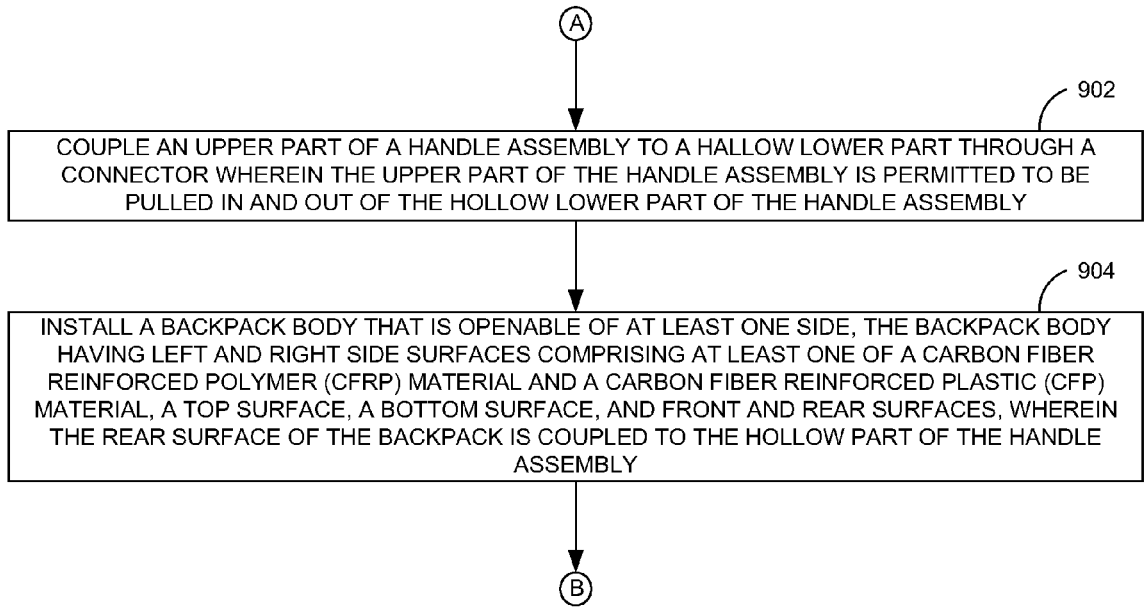
FIG. 9A and 9B illustrate a flow chart showing a method of simultaneous human and luggage transportation through an airport, according to one exemplary embodiment.
Figure 9B:
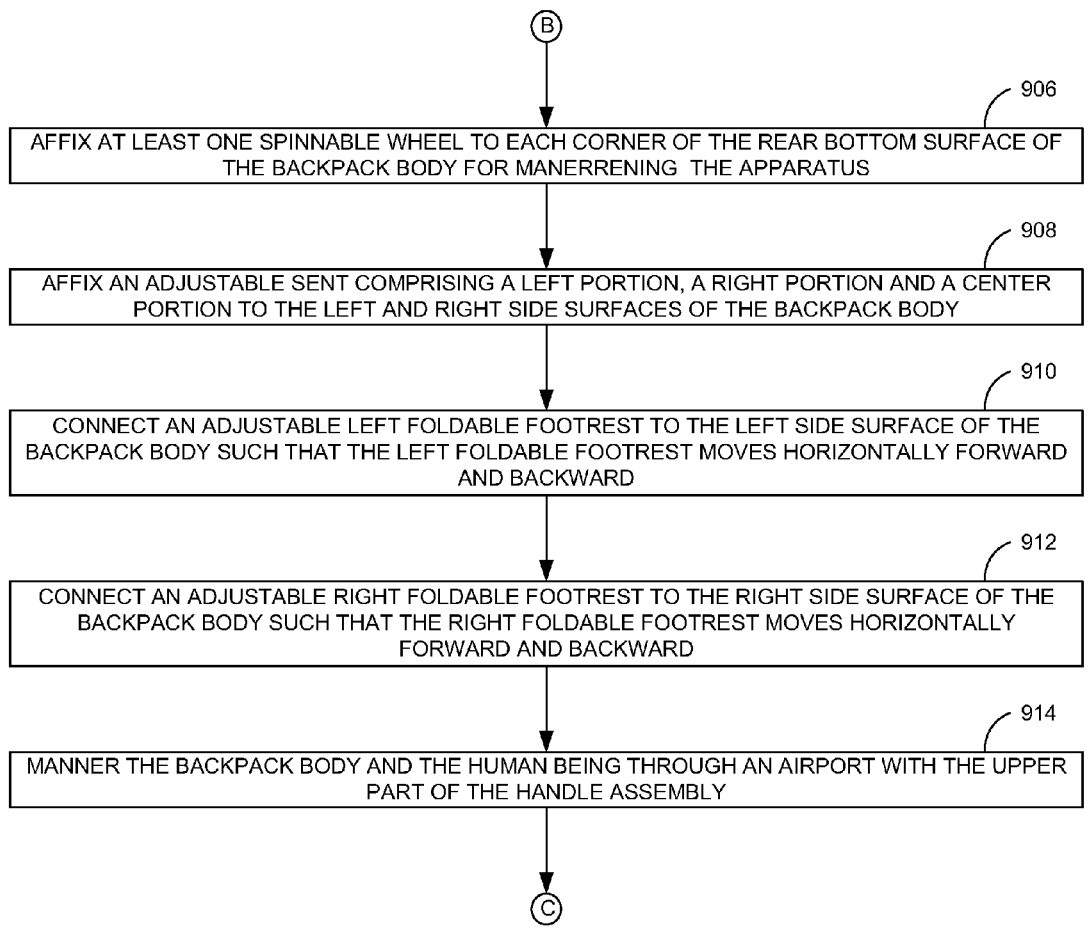

FIG. 9A and 9B are flow charts illustrating a method of simultaneous human and luggage transportation through an airport by coupling an upper part 104 of a handle assembly to a hollow lower part 106 through a connector 108 wherein the upper part 104 of the handle assembly may be permitted to be pulled in and out of the hollow lower part 106 of the handle assembly. According to this embodiment, a backpack body 102 that is openable on least one side, the backpack body 102 having left and right side surfaces (e.g., left side surface 304 and right side surface 302 as shown in FIGS. 3A and 3B) comprising at least one of a carbon fiber-reinforced polymer 116 (CFRP) material and a carbon fiber-reinforced plastic (CRP) material, a top surface 806, a bottom surface 804, and front and back surfaces (e.g., front surface 402 and back surface 802 as shown in FIGS. 4 and 8), wherein the back surface 802 of the backpack body 102 may be coupled to the hollow lower part 106 of the handle assembly may be installed.

Another embodiment may involve affixing at least one spinable wheel (e.g., a right spinable wheel 114 and a left spinable wheel 214 of FIGS. 1 and 2) to each corner of the bottom surface 804 of the backpack body 102 for maneuvering the apparatus, affixing an adjustable seat 110 comprising a left portion 504, a right portion 502 and a center portion 506 to the left and right side surfaces (e.g., left side surface 304 and right side surface 302 as shown in FIGS. 3A and 3B) of the backpack body 102, connecting an adjustable left foldable foot rest 212 to the left side surface 304 of the backpack body 102 such that the left foldable foot rest 212 may move horizontally forward and backward, connecting an adjustable right foldable foot rest 112 to the right side surface 302 of the backpack body 102 such that the right foldable footrest 112 may move horizontally forward and backward and maneuvering the backpack body 102 and the human 702 with the upper part 104 of the handle assembly.

Figure 10:
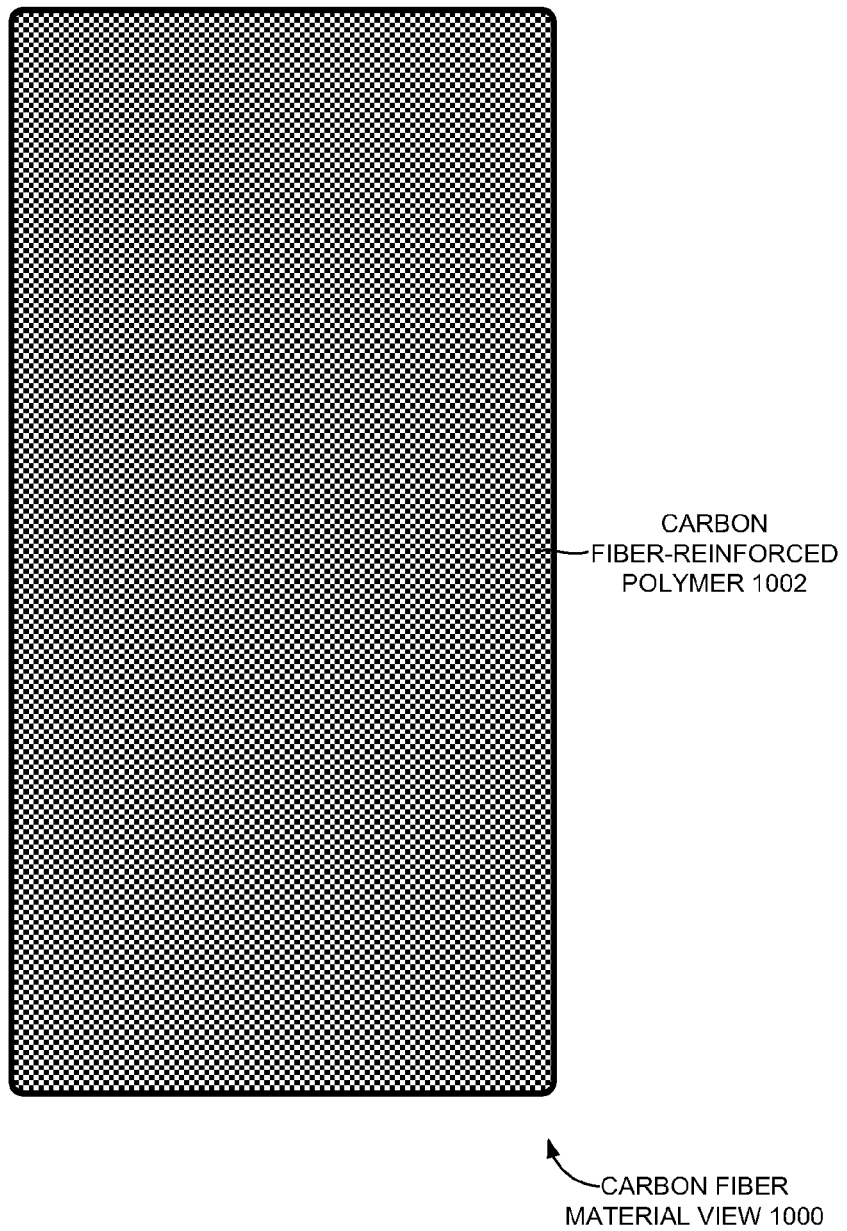
FIG. 10 shows a carbon fiber material view and illustrates a carbon fiber-reinforced polymer.

FIG. 10 illustrates a carbon fiber material view 1000. The left side surface 304, the right side surface 302, the adjustable seat 110, the left foldable footrest 212 and the right foldable footrest 112 may comprise a carbon fiber-reinforced polymer 116 or a carbon fiber-reinforced plastic, according to one embodiment.

A carbon fiber-reinforced polymer 116 (CFRP) or carbon fiber-reinforced plastic (CRP), may be a very strong, light, and expensive composite material or fiber-reinforced polymer according to one embodiment. Similar to fiberglass (glass reinforced polymer); the composite material may commonly be referred to by the name of its reinforcing fibers (carbon fiber) according to another embodiment. The polymer may most often be epoxy, but other polymers, such as polyester, vinyl ester or nylon, may sometimes be used. Some composites may contain both carbon fiber and other fibers such as Kevlar, aluminum, and fiberglass reinforcement. The terms graphite-reinforced polymer or graphite fiber-reinforced polymer (GFRP) may also be used according to an exemplary embodiment.

Materials produced with the methodology mentioned in Paragraph [0050] may often be generically referred to as composites, according to one embodiment. The choice of matrix (e.g., as shown in FIG. 10) may have a profound effect on the properties of the finished composite. One method of producing graphite-epoxy parts may be by layering sheets of carbon fiber cloth into a mold in the shape of the final product. The alignment and weave of the cloth fibers may be chosen to optimize the strength and stiffness properties of the resulting material (e.g., the adjustable seat 110), according to another embodiment. The mold may then filled with epoxy and may be heated or air-cured. The resulting part may be very corrosion-resistant, stiff, and strong for its weight (e.g., the left foldable footrest 212 and the right foldable footrest 112), according to an exemplary embodiment. Other parts may be manufactured by draping cloth over a mold, with epoxy either pre-impregnated into the fibers or painted over it. High-performance parts (e.g., the left side surface 304, the right side surface 302, the adjustable seat 110, the left foldable footrest 212 and the right foldable footrest 112) using single molds may be often vacuum-bagged and/or autoclave-cured to increase strength (to be able to support the weight of a human being), according to one embodiment, according to one embodiment.

The process by which a carbon fiber-reinforced polymer 116 is made may vary, depending on the piece being created and the finish (outside gloss) required. A fiberglass, carbon fiber or aluminum mold may be polished and waxed, and may have a release agent applied before the fabric and resin are applied, and the vacuum may be pulled and set aside to allow the piece to cure (harden), according to one embodiment. According to another embodiment, a wet layup, where a two-part resin is mixed and applied before being laid in the mold and placed in the bag may be used. A dry fabric and mold may also be placed inside the bag while the vacuum pulls the resin through a small tube into the bag, then through a tube with holes or something similar to evenly spread the resin throughout the fabric, according to one embodiment. Wire loom may work perfectly for a tube that may require holes inside a bag. Both of these methods of applying resin may require hand work to spread the resin evenly for a glossy finish with very small pin-holes. A dry layup may also be used, according to another embodiment, to construct a composite material (i.e., a carbon fiber-reinforced polymer 116). The carbon fiber-reinforced polymer 116 material may already be impregnated with resin and may be applied to the mold in a similar fashion to adhesive film. The assembly may then be placed in a vacuum to cure. The dry layup method may have the least amount of resin waste and may achieve lighter constructions than wet layup. In one embodiment, because larger amounts of resin may be more difficult to bleed out with wet layup methods, pre-impregnated parts may generally have fewer pinholes. Pinhole elimination with minimal resin amounts may generally require the use of autoclave pressures to purge the residual gases out, according to an exemplary embodiment.

A quicker method may use a compression mold. This may be a two-piece (male and female) mold and may be made out of fiberglass or aluminum that may be bolted together with the fabric and resin between the two. The benefit may be that, once it is bolted together, it may be relatively clean and may be moved around or stored without a vacuum until after curing. The carbon fiber-reinforced polymer 116 may also be created with a single layer of carbon fabric, and filled with fiberglass. A tool called a chopper gun may be used. Once a thin shell is created out of carbon fiber, the chopper gun is a pneumatic tool that may cut fiberglass from a roll and may sprays resin at the same time, so that the fiberglass and resin may be mixed on the spot. The resin may be either external mix, wherein the hardener and resin may be sprayed separately, or internal, where they may be mixed internally, which may require cleaning after every use. For difficult or convoluted shapes, a filament winder may be used to make the carbon fiber-reinforced polymer 116.

A carbon fiber-reinforced polymer 116 may be an increasingly notable material used in structural engineering applications, according to one embodiment. According to this embodiment, it may be proven to be cost-effective in a number of field applications such as strengthening concrete, masonry, steel, cast iron, and timber structures. Its use in industry may be either for retrofitting to strengthen an existing part (e.g., the left side surface 304, the right side surface 302, the adjustable seat 110, the left foldable footrest 212 and the right foldable footrest 112) or as an alternative reinforcing (or pre-stressing material) instead of steel.

Retrofitting has become the increasingly dominant use of the material in civil engineering and high-end product design, and applications may include increasing the load capacity of old consumer products (such as baby carriages, strollers, etc.) that were designed to tolerate far lower service loads and weight. Retrofitting may be popular in many instances as the cost of replacing the deficient designs for consumer products may greatly exceed its strengthening using a carbon-fiber reinforced polymer 116 (e.g., the adjustable seat 110, the backpack body 102 etc.).

Applied to the adjustable seat 110, the left foldable footrest 212, the right foldable footrest 112, and the left and right side surfaces of the backpack body 102, the carbon-fiber reinforced polymer 116 may typically have a large impact on strength (doubling or more the strength of the section may not be uncommon), but only a moderate increase in stiffness (perhaps a 10% increase). This may be because the material used in this application may typically be very strong (e.g., 3000 MPa ultimate tensile strength, more than 10 times mild steel) but not particularly stiff (150 to 250 GPa, a little less than steel, is typical). As a consequence, only small cross-sectional areas of the material may be used (e.g., a left side surface 304 and a right side surface 302). Small areas of very high strength but moderate stiffness material may significantly increase strength, but not stiffness, this adding to the strength of the present invention, according to one embodiment.

A carbon-fiber reinforced polymer 116 may also be applied to enhance shear strength of a reinforced product (e.g., the adjustable seat 110) by wrapping fabrics or fibers around the section to be strengthened. Wrapping around sections may also enhance the ductility of the section, greatly increasing the resistance to collapse under heavy weight (e.g., the weight of human 702). If a column is circular (or nearly so) an increase in axial capacity may also be achieved by wrapping, according to one embodiment. In this embodiment, the confinement of the carbon-fiber reinforced polymer 116 wrap may enhance the compressive strength of the product (e.g., the left side surface 304 of the backpack body 102).

Specialist ultra-high modulus carbon-fiber reinforced polymer material (with tensile modulus of 420 GPa or more) may be one of the few practical methods of strengthening a typical product (e.g., the left foldable footrest 212 or the right foldable footrest 112). In typical use, it may be bonded to the tensile flange of the section, both increasing the stiffness of the section and lowering the neutral axis, thus may greatly reduce the maximum tensile stress in the cast iron. When used as a replacement for steel, carbon-fiber reinforced polymer 116 bars may be used to reinforce consumer products (such as a backpack body 102).

According to one embodiment, the carbon-fiber reinforced polymer 116 may be used as a pre-stressing material due to its high strength. The advantages of the carbon-fiber reinforced polymer 116 over steel as a pre-stressing material, namely its light weight and corrosion resistance, may enable the carbon-fiber reinforced polymer 116 to be used for niche applications such as in offshore environments, adventure-travel equipment, search and rescue equipment etc., according to one embodiment. The carbon-fiber reinforced polymer 116 may also be a more costly material than its counterparts in the construction industry, glass fiber-reinforced polymer (GFRP) and aramid fiber-reinforced polymer (AFRP), though the carbon-fiber reinforced polymer 116 may, in general, have superior properties, according to another embodiment.

Figure 11:
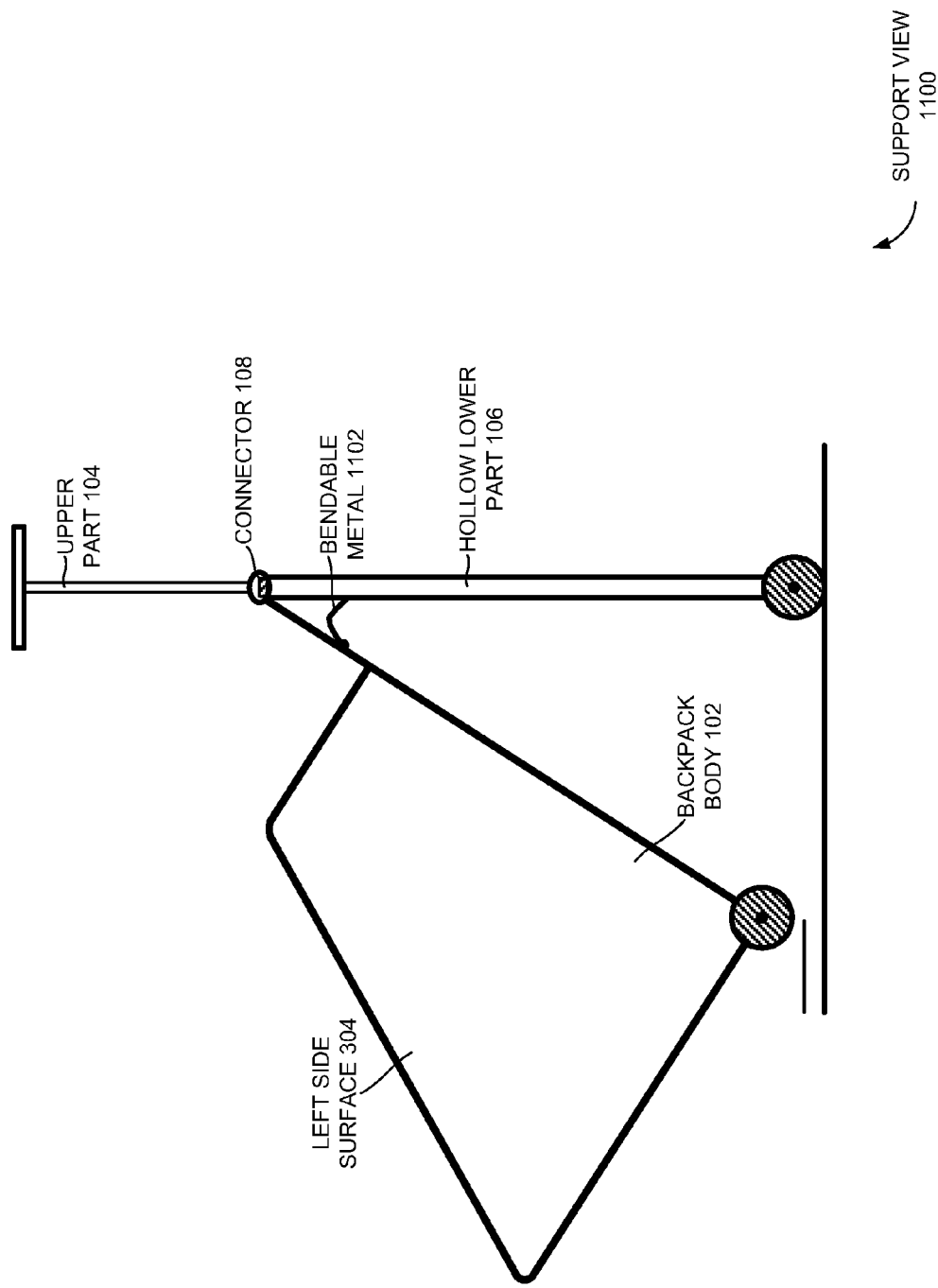
FIG. 11 shows a support view and illustrates an exemplary embodiment wherein a backpack body is supported by a bendable metal that provides additional support in addition to a hollow lower part.

FIG. 11 shows a support view 1100 and illustrates an exemplary embodiment wherein a backpack body 102 is supported by a bendable metal 1102 that provides additional support in addition to a hollow lower part 106.

What is claimed is:

1. An apparatus comprising:
a handle assembly comprising an upper part and a hollow lower part wherein the upper part is coupled to the hollow lower part through a connector and can be pulled in and out of the hollow lower part;
a backpack body that is openable at at least one side, the backpack body having left and right side surfaces comprising at least one of a carbon fiber-reinforced polymer (CFRP) material and a carbon fiber-reinforced plastic (CRP) material, a top surface, a bottom surface, and front and back surfaces, wherein the back surface of the backpack is coupled to the hollow lower part of the handle assembly;
at least one spinable wheel affixed to each corner of the bottom surface of the backpack body;
an adjustable seat comprising a left portion, a right portion and a center portion affixed to the left and right side surfaces of the backpack body;
an adjustable left foldable foot rest affixed to the left side surface of the backpack body such that the left foldable foot rest moves horizontally forward and backward; and
an adjustable right foldable foot rest affixed to the right side surface of the backpack body such that the right foldable footrest moves horizontally forward and backward.

2. The apparatus of claim 1 wherein the adjustable seat further comprises at least one of the carbon fiber-reinforced polymer (CFRP) material and the carbon fiber-reinforced plastic (CRP) material.

3. The apparatus of claim 1 wherein the left foldable foot rest comprises at least one of the carbon fiber-reinforced polymer (CFRP) material and the carbon fiber-reinforced plastic (CRP) material.

4. The apparatus of claim 1 wherein the right foldable foot rest comprises at least one of the carbon fiber-reinforced polymer (CFRP) material and the carbon fiber-reinforced plastic (CRP) material.

5. The apparatus of claim 1 wherein at least one of a shoulder harness and a shoulder strap is affixed to the back surface of the backpack body to permit the apparatus to function as a backpack.

6. The apparatus of claim 1 wherein the adjustable seat comprises cloth.

7. The apparatus of claim 1 wherein the adjustable seat comprises leather.

8. A system of simultaneous human being and luggage transportation through an airport comprising:
a handle assembly for maneuvering the system comprising an upper part and a hollow lower part wherein the upper part is coupled to the hollow lower part through a connector and can be pulled in and out of the hollow lower part;
a backpack body that is openable at at least one side, the backpack body having left and right side surfaces comprising at least one of a carbon fiber-reinforced polymer (CFRP) material and a carbon fiber-reinforced plastic (CRP) material, a top surface, a bottom surface, and front and back surfaces, wherein the back surface of the backpack is coupled to the hollow lower part of the handle assembly;
at least one spinable wheel affixed to each corner of the bottom surface of the backpack body for maneuvering the apparatus;
an adjustable seat comprising a left portion, a right portion and a center portion affixed to the left and right side surfaces of the backpack body;
an adjustable left foldable foot rest affixed to the left side surface of the backpack body such that the left foldable foot rest moves horizontally forward and backward; and
an adjustable right foldable foot rest affixed to the right side surface of the backpack body such that the right foldable footrest moves horizontally forward and backward.

9. The system of claim 8 wherein the adjustable seat further comprises at least one of the carbon fiber-reinforced polymer (CFRP) material and the carbon fiber-reinforced plastic (CRP) material.

10. The system of claim 8 wherein the left foldable foot rest comprises at least one of the carbon fiber-reinforced polymer (CFRP) material and the carbon fiber-reinforced plastic (CRP) material.

11. The system of claim 8 wherein the right foldable foot rest comprises at least one of the carbon fiber-reinforced polymer (CFRP) material and the carbon fiber-reinforced plastic (CRP) material.

12. The system of claim 8 wherein at least one of a shoulder harness and a shoulder strap is affixed to the back surface of the backpack body to permit the apparatus to function as a backpack.

13. The system of claim 8 wherein the adjustable seat comprises cloth.

14. The system of claim 8 wherein the adjustable seat comprises leather.

15. A method of simultaneous human and luggage transportation through an airport comprising:
    coupling an upper part of a handle assembly to a hollow lower part through a connector wherein the upper part of the handle assembly is permitted to be pulled in and out of the hollow lower part of the handle assembly;
    installing a backpack body that is openable at at least one side, the backpack body having left and right side surfaces comprising at least one of a carbon fiber-reinforced polymer (CFRP) material and a carbon fiber-reinforced plastic (CRP) material, a top surface, a bottom surface, and front and back surfaces, wherein the back surface of the backpack is coupled to the hollow lower part of the handle assembly;
    affixing at least one spinable wheel to each corner of the bottom surface of the backpack body for maneuvering the apparatus;
    affixing an adjustable seat comprising a left portion, a right portion and a center portion to the left and right side surfaces of the backpack body;
    connecting an adjustable left foldable foot rest to the left side surface of the backpack body such that the left foldable foot rest moves horizontally forward and backward;
    connecting an adjustable right foldable foot rest to the right side surface of the backpack body such that the right foldable footrest moves horizontally forward and backward;
    maneuvering the backpack body and the human through an airport with the upper part of the handle assembly.

16. The method of claim 15 wherein the adjustable seat further comprises at least one of the carbon fiber-reinforced polymer (CFRP) material and the carbon fiber-reinforced plastic (CRP) material.

17. The method of claim 15 wherein the left foldable foot rest comprises at least one of the carbon fiber-reinforced polymer (CFRP) material and the carbon fiber-reinforced plastic (CRP) material.

18. The method of claim 15 wherein the right foldable foot rest comprises at least one of the carbon fiber-reinforced polymer (CFRP) material and the carbon fiber-reinforced plastic (CRP) material.

19. The method of claim 15 wherein at least one of a shoulder harness and a shoulder strap is affixed to the back surface of the backpack body to permit the apparatus to function as a backpack.

* * * * *